UNITED STATES PATENT OFFICE 2,120,588

PRINTING INK

Joseph G. Curado, Jackson Heights, Long Island, N. Y., assignor to General Printing Ink Corporation, New York, N. Y., a corporation of Delaware No Drawing. Application May 16, 1936, Serial No. 80,168

3 Claims. (Cl. 134—35)

This invention relates to an improved method of making printing inks and to the inks made by such method.

Printing inks, in general, are composed of liquid vehicles with which are intimately mixed, finely divided, insoluble pigments. In the preparation of vehicles, oils are commonly employed. These may be either drying or non-drying. Drying vehicles are oils usually prepared by heat-treating, air-blowing, or both, with or without the addition of natural or synthetic resins, or waxes. Among the drying oils employed are linseed, China wood, perilla, soya bean, and fish oils, either alone or in combination. Non-drying vehicles may be simply mineral oils or rosin oils, or they may be solutions of natural or synthetic resins or waxes in mineral oils, rosin oils, or any other suitable solvents or combination of solvents. Water-soluble non-drying vehicles also are used to a limited extent for special inks, but these do not come within the purview of this invention.

The pigments commonly used in printing inks are the great variety of coal-tar-derivative lakes and toners, various carbon blacks and lamp blacks, the manufactured mineral pigments, such as chrome yellows and greens, cadmium yellows and reds, iron blues and reds, lead-, zinc-, and titanium-whites, and the extenders, aluminum hydroxide, magnesium carbonate, and barium sulfate, all in the dry, powdered form.

In making an ink the pigment is first mixed with the vehicle by means of a pony mixer, dough mixer, or other suitable mechanical device. Then, to effect the desired degree of fineness or dispersion, the mixture is intimately ground by means of a multiple roll-mill, colloid-mill, ball-mill, or other suitable equipment.

How successfully an ink may be made to fulfill all the requirements of a specific use is dependent on the vehicle, on the characteristics of the pigment employed therein, and on the degree of dispersion of the pigment in the vehicle. The characteristics of a given type of oily vehicle are capable of variation to fit specific applications. On the other hand, although individual pigments differ widely in their characteristics, the characteristics of a given pigment are fixed. Accordingly it is always necessary to adjust the vehicle to the demands of the pigment required to give an ink of the desired color.

To illustrate: for an ordinary cylinder-press ink a No. 2 linseed varnish, as vehicle, might, from the standpoint of tack, setting rate, drying characteristics, and viscosity, be ideal if ground with a phloxine toner, but if ground with Milori blue the resulting ink would be too tacky and too rapid-drying; if ground with a para red it would be too tacky and would mottle excessively; if ground with a chrome yellow it would be too fluid, and too rapid-drying; if ground with a phospho-tungstic green it would be too short and too slow-drying. In fact, no two pigments, when ground in the same vehicle, give inks alike in consistency, tack, setting rate, drying characteristics, lying qualities, printing qualities, or length. This condition leads to great complexity of formulation in inks designed for similar uses, since "doctoring" must be resorted to to offset as far as possible the effect of the variation in characteristics of the pigments employed.

Hardness is a characteristic, varying with each pigment, but common to all pigments that are produced by precipitation from aqueous solutions with subsequent removal by evaporation, in air, of the residual water. All such dry pigments are dispersed in oily vehicles with a degree of difficulty varying widely for different pigments. Chrome yellows and zinc whites are representative of the most easily ground pigmets and require ordinarily two runs on a three roller mill. Iron blues and para red toners are representatives of harder pigments requiring from four to six runs on a three roller mill. Methyl violet, reflex blue, and Scarlet 2R toners are representative of pigments which cannot be satisfactorily ground by any commercially feasible number of runs on a mill. These last-named pigments are usually mixed with vehicles while in the so-called pulp form. Pulps, which are the product of filtering the precipitated pigments from their mother liquors, consist of from 15% to 30% pigment and from 70% to 85% water. When certain pulps are mixed with oily vehicles under conditions well-known to the art, some selective wetting of the pigment by the vehicle occurs with subsequent separation ("flushing") of part of the water. The remaining water must be removed by evaporation with heat, preferably in vacuo. This is a slow and relatively costly process. Inks thus produced from pulp are superior to those made from dry pigments, since the pigments, having never been dried and their particles agglomerated, attain a greater degree of dispersion in the vehicle. This greater dispersion of the pigment particles gives added brilliance and color-strength to the inks, and avoids the danger of filling up "screens" and of wearing printing surfaces as with dry-pigment inks when poorly ground particles of pigment are present.

The important characteristics varying with each dry pigment are hardness, oil-absorption, drier-absorption (or adsorption), and the tendency to react chemically, or physically, with vehicles or their constituents.

The invention hereinafter described obviates the need of adjusting the vehicle to the varying individual characteristics of dry pigments. This it does by the expedient of effectively isolating each pigment particle from the vehicle in which it is suspended, by an interfacial layer completely covering the surface of each particle as a tightly adhering film of water or other fluid insoluble in the vehicle. Furthermore, since the isolating film is the same for each, all pigments have the same relation to the vehicle and much simplification in ink-formulation thereby becomes possible. In addition this new method effects thorough dispersion of the pigment and large increase in color-strength without recourse to the relatively expensive, and in some cases, non-feasible, process of flushing and dehydrating. This dispersion in water so softens the pigment that the process of grinding is considerably shortened.

Obviously, in my new, water-wet pigment inks, as in the old, dry-pigment inks, the pigment must be finely dispersed throughout the vehicle. Since the oily vehicle does not "wet" the water-wet pigment, the latter must be caused to form the inner phase of a water-in-oil type of emulsion, and a suitable stabilizing agent must be added if the vehicle does not provide adequate stabilization.

The addition of water to inks is not new. In the earlier ink-emulsions, however, the dry pigment was ground in the oily vehicle and the water was emulsified with this vehicle-pigment mixture so that the vehicle and pigment formed the outer phase of the emulsion. In my new ink the pigment is dispersed in a quantity of water sufficient to provide a thick paste, and this paste, consisting of water-wet pigment, is dynamically dispersed in and stably emulsified with the vehicle, the water-wet pigment being, as stated above, the inner phase of the emulsion.

It is my invention, therefore, to prepare a new and valuable type of ink consisting of a stable emulsion of the water-in-oil type, in which the continuous or outer phase of the emulsion is provided by the usual ink vehicles, and the inner phase is made up of dispersed pigment particles that are wetted with water, or other oil-immiscible liquid, which forms an interfacial layer between the pigment particles and the vehicle. Pigment dispersion in the water is effected with the aid of suitable wetting agents, dispersing agents, or deflocculating agents, hereinafter generically referred to as dispersing agents, which, added to the mixture of pigment and water, or other oil-immiscible liquid, serve to break up the pigment aggregates into minute substantially individual particles by effecting a maximum wetting of the pigment surface with water, or other oil-immiscible liquid. They also prevent any re-formation of aggregates, and the result is a stable dispersion of the pigment particles in the water or other oil-immiscible liquid. The water or vehicle-insoluble layer may represent from about 6 to 50% of the final ink. This dispersion may be made directly from the wet pigment mass, or pulp, or press cake as it comes from the filter press or, if desired, additional dry pigment may be added to the dispersion thus first formed. It is this pigment dispersion that is subsequently emulsified in the oily vehicle.

It will be understood that the term "dispersing agent" as used in this specification is synonymous with "deflocculating agent", and applies to a wide range and rather large number of materials which serve to disintegrate aggregates, or flocks, of fine particles in a liquid and to keep such aggregates from re-forming. The mechanism of such action is not thoroughly understood. Dispersing agents useful for this purpose include both organic and inorganic materials. Many of them are simple and commonly known compounds whose dispersing effects in general have been recognized; others are commercial products of unpublished composition. I have also found that certain compounds not previously known to have dispersing properties can be successfully used in preparing my ink. Included, for instance, is oxalic acid. Though it is not commonly designated as a dispersing agent, it is very efficient in dispersing the ferro-ferri cyanide blues, which are known variously in the trade as Milori blues, bronze blues, and Prussian blues. Commercial dispersing agents, many of them organic in nature, include "Gardinol", "Darvan", "Erkalin", "Areskap", all of which have been found useful in practicing my invention. These commercial dispersing agents are well known to colloid chemists generally and while the exact formula for any specific dispersing agent is secret with its manufacturer, it is generally known that these compounds are typified by such agents as the sulfonated condensation product of hydroxy-di-phenyl alcohol, described in British Patent No. 409,773, to Rubber Service Laboratories Company, accepted May 10, 1934, and by the condensation of naphthalene sulfonic acid with formaldehyde, as described in U. S. Patent 1,336,759, issued to Otto Schmidt, on April 13, 1920. While the above mentioned dispersing agents are preferred other dispersing agents can also be successfully used to deflocculate the pigment particles in water or other vehicle immiscible liquid.

In order to illustrate some of the preferred embodiments of my invention, I now give formulas and methods for the compounding of some of the new and valuable printing inks which may be made according to my invention. The examples here given will refer to three different types of inks, viz., those suited to (1) general printing, (2) newspaper printing, and (3) magazine printng; but it is understood that they are illustrative only and are not to be interpreted as limiting the scope of my invention in any way.

*Example No. 1*

An ink suitable for general use and commonly employed on cylinder presses: Red Lake C toner dry 25%, water 24.5%, "Erkalin" (a dispersing agent found to be especially efficient with this pigment) 5%, No. 3 linseed varnish 20%, blown linseed oil 16%, petrolatum 12%, lead naphthenate (drier) 2%.

The "Erkalin" is first dissolved in the water, which may be at room temperature or warmed to approximately 140° F. (Temperatures up to the boiling point may be employed but such elevated temperatures are not recommended for ordinary operation of this invention.) After the dispersing agent is in solution the dry pigment is mixed in. This may be done with a pony mixer, a dough mixer, or other suitable mechanical means. After thorough mixing, the "pulp" thus produced is preferably, although not necessarily, allowed to soak several hours to insure efficient dispersion of the pigment in the water. The linseed varnish, blown linseed oil, petrolatum, and drier (lead naphthenate) are mixed with a pony mixer, or suitable apparatus, and when thoroughly mixed, the previously described dispersed pulp is added to this vehicle in the mixer and violently agitated to bring the water-wet pigment particles to a fine state of subdivision uniformly dispersed in the vehicle.

This operation effects emulsification of the water-wet pigment in the vehicle. If the mixer is highly efficient the ink will then be found suitable for some printing requirements, but if full advantage is to be had of the color strength of the pigment one run on a multiple roll mill will suffice to produce an ink of superior fineness and color strength.

This formula can be varied in any of a great number of ways known to one skilled in the art without departing from the spirit of this invention, as for instance: different proportions of pigment and water with different dispersing agents might be employed; the No. 3 linseed can be substituted by No. 1 or No. 2 or can be used in greater or lesser proportions; the petrolatum can be substituted by lanolin or replaced by blown oils, or by a regular linseed varnish and an emulsifying agent which favors the production of water-in-oil emulsions.

Example No. 2

An ink suitable for use on web presses for printing hand bills, colored supplements for newspapers, and the like.

20% of phloxine pulp from filter press, 10% of dry lithol toner, medium, 3% of zinc oxide, 0.2% of "Darvan", 0.1% of "Erkalin" 33.6% of a solution of 4 parts of rosin in 6 parts of a mineral oil having a viscosity of 320 at 130° F., S. U. V., 6% of lanolin, 21% of mineral seal oil having a viscosity of 120 at 100° F., S. U. V.

The dispersing agents, "Darvan" and "Erkalin", are added to the phloxine pulp in a dough mixer or other suitable mixing equipment. The action of these agents converts the originally rather solid pulp to a fluid. When this state is reached the lithol and zinc oxide are added and subjected to a thorough mixing. As in the previous case the pulp mixture is preferably, but not necessarily, allowed to soak several hours. The rosin solution and lanolin are thoroughly mixed in a pony mixer or other suitable mixing equipment. The pulp is added to the vehicle so formed and by vigorous agitation is emulsified with the vehicle. This heavy emulsion is given a run over a multiple-roll mill. The mineral seal oil is now added and thoroughly mixed in to form a finished ink of suitable fluidity.

This formula, too, can be radically altered by one skilled in the art without departing from the spirit of this invention. For instance, different pulps and/or pigments might be employed in the same or in other proportions; different dispersing agents might be used; other oils might be used with rosin or other natural resins or with synthetic resins; lanolin might be reduced in amount, or eliminated, or replaced by petrolatum or other materials.

Example No. 3

A process red for magazine printing.

40% phloxine pulp, 1% "N. D. A. solution" (dispersing agent), 17% No. 2 linseed varnish, 20% No. 3 linseed varnish, 10% blown linseed oil, 10% petrolatum, and 2% lead naphthenate.

The phloxine pulp is thoroughly worked up in a pony mixer, dough mixer, or other suitable apparatus after which the dispersing agent, "N. D. A. solution", is added. After thorough mixing the pulp is preferably, although not necessarily, allowed to soak several hours. The linseed varnish, lanolin, blown oil, and drier are thoroughly mixed in a pony mixer, whisk, or other suitable mixing apparatus. The pulp is then added with vigorous agitation to form the emulsion. This product is finished by a run over a multiroll mill or other suitable grinding device.

The proportions or ingredients of this formula, also, can be varied in any of a great number of ways by one skilled in the art without departing from the spirit of this invention. For example; pigments ground in oil may be added as toners to alter the shade or the strength of the product, or the proportions of pigment or of pulp may be changed, or the vehicle may be altered as in the preceding examples.

In this example it will be seen that, as a variation in vehicle, a linseed varnish and an emulsifying agent blown linseed oil is suggested. Since the value of the ink is dependent on the thorough emulsification of the water-wet pigment as the internal phase of a water-in-oil emulsion it is imperative that the vehicle possess adequate emulsifying properties or that a suitable emulsifier be added. If any of the common blown vegetable oils or fish oils, or if rosin, ester gum, limed rosin, or other modified form of rosin, or if natural resins such as mastic, dammar, or sandarac are employed in the vehicle, additional emulsifying agents are not needed. If, however, the vehicle is lacking in natural emulsifying properties it is necessary to incorporate some emulsifying agent capable of promoting the formation of stable water-in-oil emulsions. I have found that cholesterin and/or magnesium oleate work satisfactorily in this respect.

It will thus be seen that I have provided a new and useful method for preparing a novel printing ink that includes first dispersing the pigment in water or a vehicle immiscible liquid through the use of dispersing agents, wetting agents, surface tension depressants, deflocculating agents or the like followed by emulsifying the thus produced dispersion in a vehicle which may of itself form the continuous phase of a stable emulsion or may be given this emulsifying property by the addition of suitable emulsifying agents.

The examples and details of operation including preferred specific materials are given to illustrate the invention. This disclosure should be considered as illustrative but not restrictive of the invention which may be carried out in other ways.

Having now described my invention, what I claim is:—

1. In the manufacture of printing inks from pulp pigments, the steps of treating water wet filter press cake pulp containing in the neighborhood of 70–85% water, with a wetting agent, whereby the pigment particles are substantially completely dispersed in the water of the pulp, and whereby each individual particle is surrounded by a film of water, and thereafter stably emulsifying the water coated pigment in an oily ink vehicle without separation of the water.

2. A process of making colored printing ink from water-containing colored pulps, comprising the steps of treating a colored pigment pulp, as distinct from the use of a carbon pigment, said colored pulp containing from 70-85% water, with a wetting agent for causing each pigment particle to be coated with a film of water, and then emulsifying said water-coated pigment particles in an oily vehicle to form an emulsion of the water-in-oil type, all of the water of the original pulp being retained in the finished ink.

3. A process of making colored printing inks from colored pigments normally having widely differing dispersing - with - oil characteristics, comprising the steps of treating the various pigments in the form of pulps containing about 70 to 85% water, with wetting agents for causing each pigment particle to be enveloped in a film of water, whereby the emulsifying-with-oil properties of the several pigments are rendered substantially the same, and thereafter emulsifying said water-coated pigment particles in an oily vehicle to form an emulsion of the water-in-oil type, in which the water of the original colored pulp is permanently retained.

JOSEPH G. CURADO.